United States Patent
Mills et al.

(10) Patent No.: US 8,538,328 B2
(45) Date of Patent: Sep. 17, 2013

(54) ANTENNA AND SATELLITE ALIGNMENT USING BEAM PROJECTIONS

(75) Inventors: Raymond L. Mills, Calhan, CO (US); Remberto L. Martin, Centennial, CO (US)

(73) Assignee: ViaSat, Inc., Carlsbad, CA (US)

( * ) Notice: Subject to any disclaimer, the term of this patent is extended or adjusted under 35 U.S.C. 154(b) by 478 days.

(21) Appl. No.: 12/544,130

(22) Filed: Aug. 19, 2009

(65) Prior Publication Data

US 2010/0062706 A1 Mar. 11, 2010

Related U.S. Application Data

(60) Provisional application No. 61/095,979, filed on Sep. 11, 2008.

(51) Int. Cl.
*H04B 7/185* (2006.01)
*H04W 4/00* (2009.01)

(52) U.S. Cl.
USPC ......... 455/13.3; 455/12.1; 455/13.1; 455/429

(58) Field of Classification Search
USPC ............... 455/13.1, 12.1, 427, 429, 67.13, 455/13.3
See application file for complete search history.

(56) References Cited

U.S. PATENT DOCUMENTS

| 4,041,397 A | 8/1977 | Bauer et al. |
| 4,287,598 A | 9/1981 | Langseth et al. |
| 4,599,619 A * | 7/1986 | Keigler et al. ............... 342/352 |
| 4,630,058 A * | 12/1986 | Brown ........................ 342/359 |
| 4,858,229 A | 8/1989 | Rosen et al. |
| 4,910,792 A | 3/1990 | Takahata et al. |
| 5,408,237 A * | 4/1995 | Patterson et al. ............ 342/354 |
| 5,465,410 A | 11/1995 | Hiben et al. |
| 5,550,550 A | 8/1996 | Das |
| 5,839,050 A | 11/1998 | Baehr et al. |

(Continued)

FOREIGN PATENT DOCUMENTS

| EP | 0 837 569 | 4/1998 |
| EP | 0911992 A2 | 4/1999 |

(Continued)

OTHER PUBLICATIONS

Data Over Cable Service Interface Specifications (DOCSIS 3.0): Physical Layer Specification, May 22, 2008. Available from www.cablemodem.com. Downloaded on Oct. 9, 2008. Cable Television Laboratories, Inc. Copyright 2006-2008. CM-SP-PHYv3.0-107-080522.

(Continued)

*Primary Examiner* — Tilahun B Gesesse
(74) *Attorney, Agent, or Firm* — Holland & Hart LLP

(57) ABSTRACT

Disclosed is a satellite beam pointing system that uses color encoded signals from subscribers to align antennas on a satellite and to align the satellite. Subscribers detect the signal strength and signal-to-noise ratio of signals that are transmitted from the satellite. The values of the signal strength and signal-to-noise ratio data are encoded in signals that are transmitted back to a ground station that color encodes the data and graphically displays the signal strength and signal-to-noise ratio of the subscriber received signals. The actual beam projection can then be determined and the satellite antennas moved, so that the actual beam projection coincides with the intended beam projection. Also, the satellite can be properly oriented using this technique.

38 Claims, 4 Drawing Sheets

(56) References Cited

U.S. PATENT DOCUMENTS

| | | | |
|---|---|---|---|
| 5,987,233 | A | 11/1999 | Humphrey |
| 5,991,306 | A | 11/1999 | Burns et al. |
| 5,991,622 | A | 11/1999 | Henry, Jr. |
| 6,047,171 | A | 4/2000 | Khayrallah et al. |
| 6,052,084 | A * | 4/2000 | Aoshima et al. .............. 342/358 |
| 6,150,977 | A * | 11/2000 | Wilcoxson et al. ........... 342/355 |
| 6,169,513 | B1 | 1/2001 | Cohen |
| 6,272,679 | B1 * | 8/2001 | Norin .............................. 725/62 |
| 6,288,670 | B1 * | 9/2001 | Villani et al. .................. 342/354 |
| 6,434,609 | B1 | 8/2002 | Humphrey |
| 6,442,598 | B1 | 8/2002 | Wright et al. |
| 6,546,488 | B2 | 4/2003 | Dillon et al. |
| 6,601,090 | B1 | 7/2003 | Gurijala et al. |
| 6,618,751 | B1 | 9/2003 | Challenger et al. |
| 6,658,463 | B1 | 12/2003 | Dillon et al. |
| 6,678,791 | B1 | 1/2004 | Jacobs et al. |
| 6,763,006 | B1 | 7/2004 | Lockett |
| 6,825,806 | B2 * | 11/2004 | Liu et al. ....................... 342/359 |
| 6,947,440 | B2 | 9/2005 | Chatterjee et al. |
| 7,039,683 | B1 | 5/2006 | Tran et al. |
| 7,130,578 | B2 * | 10/2006 | Jarett ............................. 455/13.3 |
| 7,289,062 | B2 * | 10/2007 | Hudson et al. ................ 342/359 |
| 7,324,782 | B1 * | 1/2008 | Rudrapatna .................... 455/25 |
| 7,330,151 | B1 * | 2/2008 | Monk et al. ................... 342/359 |
| 7,359,395 | B2 * | 4/2008 | Toporek et al. ............... 370/401 |
| 7,516,236 | B2 | 4/2009 | Walsh et al. |
| 2001/0052015 | A1 | 12/2001 | Lin et al. |
| 2002/0006116 | A1 | 1/2002 | Burkhart |
| 2002/0073167 | A1 | 6/2002 | Powell et al. |
| 2002/0143984 | A1 | 10/2002 | Hudson |
| 2004/0037193 | A1 * | 2/2004 | Andersen et al. .......... 369/53.14 |
| 2004/0203444 | A1 | 10/2004 | Jarett et al. |
| 2004/0203725 | A1 * | 10/2004 | Lahav et al. .................. 455/423 |
| 2004/0224633 | A1 | 11/2004 | Coromina et al. |
| 2004/0242152 | A1 * | 12/2004 | Jarett ............................ 455/12.1 |
| 2007/0037512 | A1 | 2/2007 | Godwin |
| 2008/0056176 | A1 | 3/2008 | Hudson et al. |
| 2008/0056189 | A1 | 3/2008 | Hudson et al. |
| 2011/0222589 | A1 * | 9/2011 | Howell et al. ................. 375/213 |

FOREIGN PATENT DOCUMENTS

| | | |
|---|---|---|
| EP | 0998063 A2 | 5/2000 |
| GB | 1 223 163 | 2/1971 |
| WO | EP 0762637 | 3/1997 |
| WO | WO 99/18678 | 4/1999 |
| WO | WO 99/63711 | 12/1999 |
| WO | WO 00/46682 | 8/2000 |
| WO | WO 2004/002016 | 12/2003 |
| WO | WO 2005/067367 | 7/2005 |
| WO | WO 2008/027974 | 3/2008 |

OTHER PUBLICATIONS

Digital Video Broadcasting (DVB);Second generation framing structure, channel coding and modulation systems for Broadcasting, Interactive Services, News Gathering and other broadband satellite applications, (draft ETSI EN 302 307) version 1.1.1, Jun. 2004. Available from www.etsi.org. Downloaded on Oct. 9, 2008.

"Digital Video Broadcasting (DVB); Second Generation Framing Structure, Channel coding and Modulation Systems for Broadcasting, Interactive Services, News Gathering and other Broadband Satellite Applications", (ETSI EN 302 307) version 1.1.2, Jun. 2006. Available from www.etsi.org. Downloaded on Oct. 9, 2008.

U.S. Appl. No. 11/847,064, filed Aug. 29, 2007.
U.S. Appl. No. 11/847,102, filed Aug. 29, 2007.
U.S. Appl. No. 11/847,084, filed Aug. 29, 2007.
U.S. Appl. No. 11/847,121, filed Aug. 29, 2007.
International Search Report and Written Opinion of the International Searching Authority; International Application No. PCT US2007/077124; filed Jul. 22, 2008.
Patent Abstracts of Japan; vol. 012, No. 461 (E-689), Dec. 5, 1988, and JP 63 185129 A (NEC Corp), Jul. 30, 1988 (see abstract).
U.S. Appl. No. 61/091,984, filed Aug. 26, 2008.
U.S. Appl. No. 12/544,121, filed Aug. 19, 2009.
U.S. Appl. No. 61/095,979, filed Sep. 11, 2008.
U.S. Appl. No. 11/847,006, filed Aug. 29, 2007.
U.S. Appl. No. 61/100,206, filed Sep. 25, 2008.
U.S. Appl. No. 60/840,809, filed Aug. 29, 2006.
U.S. Appl. No. 12/265,618, filed Nov. 5, 2008.
Patent Abstracts of Japan; vol. 012, No. 452 (E-687), Nov. 28, 1988, and JP 63 179629 A (Nippon Telegr & Teleph Corp), Jul. 23, 1988 (see abstract).
Inpi, FR App. No. 0956229, Written Opinion and Search Report dated Jan. 16, 2013, 12 pgs.

* cited by examiner

US 8,538,328 B2

ANTENNA AND SATELLITE ALIGNMENT USING BEAM PROJECTIONS

CROSS REFERENCE TO RELATED APPLICATIONS

The present application is based upon and claims the benefit of U.S. provisional application Ser. No. 61/095,979, filed Sep. 11, 2008, by Raymond L. Mills, et al., entitled "Antenna and Satellite Alignment Using Beam Projections." The entire content of this application is hereby specifically incorporated herein by reference for all it discloses and teaches.

BACKGROUND OF THE INVENTION

Satellite technology has been used for a number of years for communication purposes. For example, satellites have been used to transmit television signals, Internet data, telephone signals, navigational signals and other data. Satellites have the advantage of being able to transmit communication data to the most remote parts of the world without topographical interference.

SUMMARY OF THE INVENTION

An embodiment of the present invention may therefore comprise a method of pointing and tracking antennas on a satellite using signal-to-noise ratio data relating to the signal-to-noise ratio of subscriber received signals transmitted from the satellite to subscribers at subscriber locations comprising: receiving the subscriber received signals at the subscriber locations; generating the signal-to-noise ratio data relating to the signal-to-noise ratio of the subscriber received signals; transmitting the signal-to-noise ratio data from the subscribers to a central office; analyzing the signal-to-noise ratio data to determine actual locations of beam projections of the antennas; aligning the antennas based upon the actual locations of beam projections of the antennas.

An embodiment of the present invention may further comprise a method of pointing and tracking antennas on a satellite using signal strength data relating to the signal strength of subscriber received signals transmitted from the satellite to subscribers at subscriber locations comprising: receiving the subscriber received signals at the subscriber locations; generating the signal strength data relating to the signal strength of the subscriber received signals; transmitting the signal strength data from the subscribers to a central office; analyzing the signal strength data to determine actual locations of beam projections of the antennas; aligning the antennas based upon the actual locations of beam projections of the antennas.

An embodiment of the present invention may further comprise a method of aligning a stationary satellite with respect to the earth's surface using signal-to-noise ratio data from a satellite communication system relating to the signal-to-noise ratio of subscriber received signals transmitted from the stationary satellite to subscribers at known subscriber locations comprising: receiving the subscriber received signals at the known subscriber locations; generating the signal-to-noise ratio data relating to the signal-to-noise ratio of the subscriber received signals; transmitting the signal-to-noise ratio data from the subscriber location to a central office; analyzing the signal-to-noise ratio data to determine actual locations of beam projections from antennas located on the stationary satellite; comparing the actual locations of the beam projections with intended locations of the beam projections to create a satellite alignment signal; aligning the stationary satellite with respect to the earth's surface using the satellite alignment signal.

An embodiment of the present invention may further comprise a method of aligning a stationary satellite with respect to the earth's surface using signal strength data from a satellite communication system relating to the signal strength of subscriber received signals transmitted from the stationary satellite to subscribers at known subscriber locations comprising: receiving the subscriber received signals at the known subscriber locations; generating the signal strength data relating to the signal strength of the subscriber received signals; transmitting the signal strength data from the subscriber locations to a central office; analyzing the signal strength data to determine actual locations of beam projections from antennas located on the stationary satellite; comparing the actual locations of the beam projections with intended locations of the beam projections to create a satellite alignment signal; aligning the stationary satellite with respect to the earth's surface using the satellite alignment signal.

An embodiment of the present invention may further comprise a system for aligning antennas on a satellite using signal-to-noise ratio data relating to the signal-to-noise ratio of downstream signals transmitted from the satellite to subscribers at known subscriber locations comprising: a subscriber transceiver that receives the downstream signal and transmits an upstream signal; a subscriber modem that receives the downstream signals from the transceiver, determines the signal-to-noise ratio data of the downstream signal and encodes the upstream signal with the signal-to-noise ratio data; a control system that receives the upstream signal, extracts the signal-to-noise ratio data from the upstream signal, analyzes the signal-to-noise ratio data to determine actual locations of beam projections of the antennas, compares the actual locations of the beam projections of the antennas with intended locations of the beam projections of the antennas to produce an antenna alignment signal and encodes the upstream signal with the antenna alignment signal to align the antennas.

An embodiment of the present invention may further comprise a system for aligning antennas on a satellite using signal strength data relating to the signal strength of downstream signals transmitted from the satellite to subscribers at known subscriber locations comprising: a subscriber transceiver that receives the downstream signal and transmits an upstream signal; a subscriber modem that receives the downstream signals from the transceiver, determines the signal strength data of the downstream signal and encodes the upstream signal with the signal strength data; a control system that receives the upstream signal, extracts the signal strength data from the upstream signal, analyzes the signal strength data to determine actual locations of beam projections of the antennas, compares the actual locations of the beam projections of the antennas with intended locations of the beam projections of the antennas to produce an antenna alignment signal and encodes the upstream signal with the antenna alignment signal to align the antennas.

An embodiment of the present invention may further comprise a system for aligning a satellite with the earth's surface using signal-to-noise ratio data relating to the signal-to-noise ratio of downstream signals transmitted from the satellite to subscribers at known subscriber locations comprising: a subscriber transceiver that receives the downstream signal and transmits an upstream signal; a subscriber modem that receives the downstream signals from the transceiver, determines the signal-to-noise ratio data of the downstream signal and encodes the upstream signal with the signal-to-noise ratio data; a control system that receives the upstream signal, extracts the signal-to-noise ratio data from the upstream signal, analyzes the signal-to-noise ratio data to determine actual locations of beam projections of the antennas, compares the actual locations of the beam projections of the antennas with intended locations of the beam projections of the antennas to produce a satellite alignment signal and encodes the upstream signal with the satellite alignment signal to align the satellite.

An embodiment of the present invention may further comprise a system for aligning a satellite with the earth's surface using signal strength data relating to the signal strength of downstream signals transmitted from the satellite to subscribers at known subscriber locations comprising: a subscriber transceiver that receives the downstream signal and transmits an upstream signal; a subscriber modem that receives the downstream signals from the transceiver, determines the signal strength data of the downstream signal and encodes the upstream signal with the signal strength data; a control system that receives the upstream signal, extracts the signal strength data from the upstream signal, analyzes the signal strength data to determine actual locations of beam projections of the antennas, compares the actual locations of the beam projections of the antennas with intended locations of the beam projections of the antennas to produce a satellite alignment signal and encodes the upstream signal with the satellite alignment signal to align the satellite.

DETAILED DESCRIPTION OF THE EMBODIMENTS

Figure 1A:
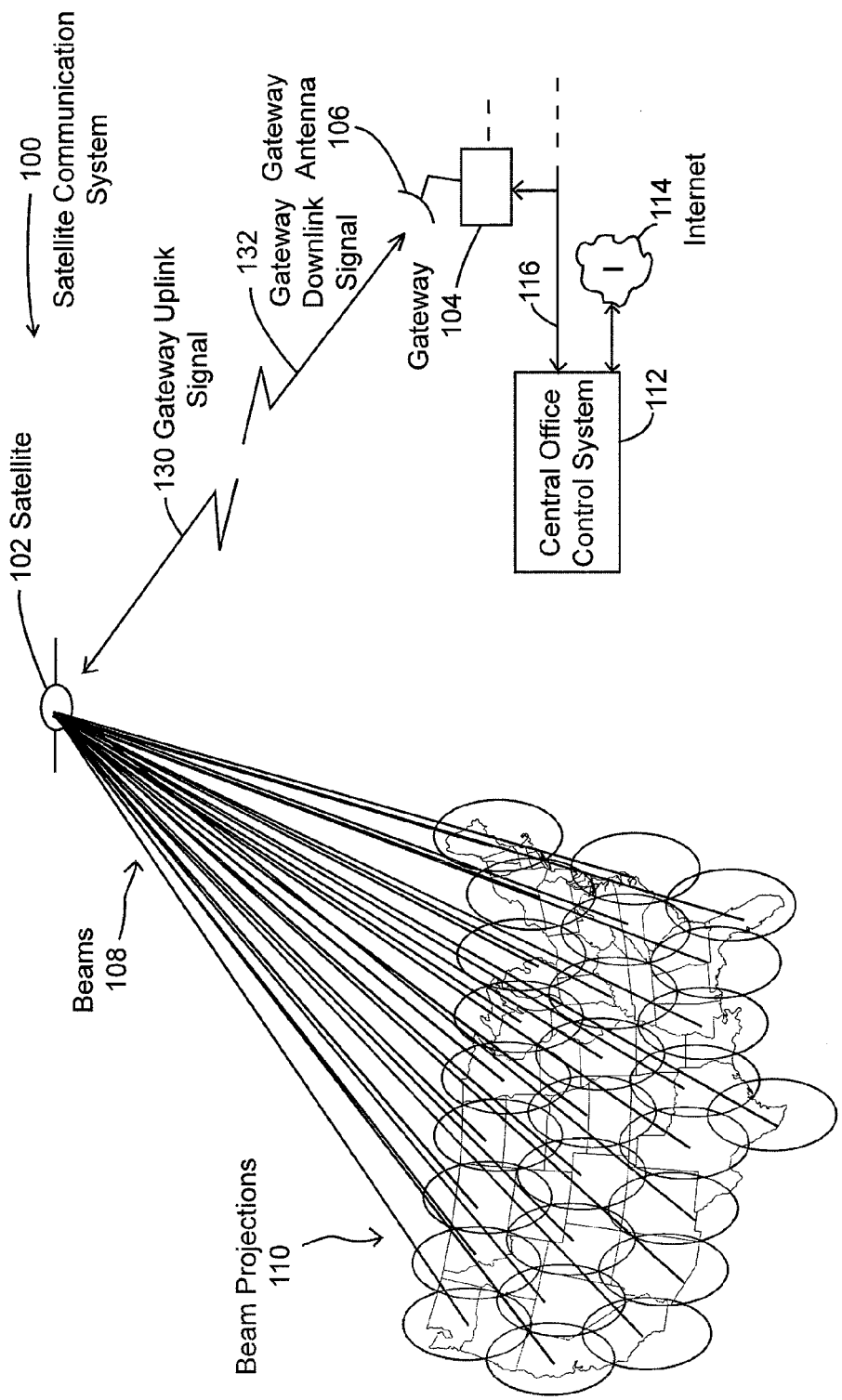
FIG. 1A is a schematic representation of an embodiment of a satellite communication system.

FIG. 1A is a schematic illustration of one embodiment of a satellite communication system. The satellite communication system is a bidirectional system such as that used by WildBlue Communications Inc., located at 5970 Greenwood Plaza Blvd., Suite 300, Greenwood Village, Colo. 80111, that delivers and receives Internet data. In accordance with the system illustrated in FIG. 1, satellite 102 has a series of antennas that project beams 108 over the USA and receive signals from subscribers located within the beam projections 110 which cover most of the area of the USA. The antennas on the satellite 102 are mounted on several different antenna arrays (pallets) which can be adjusted to be directed to different portions of the earth's surface. Some systems allow individual adjustment of antennas. The antenna arrays mounted on the satellite 102 both send and receive data so that data can be transmitted downstream to subscribers on the ground and transmitters disposed at the subscriber location can transmit data upstream to the satellite 102.

Gateway 104, illustrated in FIG. 1A, uses antenna 106 to transmit gateway uplink signals 130 to the satellite 102 via the gateway antenna 106. The gateway uplink signal is referred to as a downstream signal since it is sent downstream from the central office control system to the subscriber. Similarly, gateway 104 receives gateway downlink signals 132 from satellite 102, which is an upstream signal. As indicated in FIG. 1A, there may be more than one gateway that transmits and receives data to and from satellite 102. For example, the embodiment illustrated in FIG. 1A may have six gateways at six different locations. A high speed, wideband ground connection 116 is provided between the central office control system 112 and the gateways, such as gateway 104. Central office control system 112 operates and controls the satellite communication system 100, illustrated in FIG. 1A, and is connected to the Internet 114.

Figure 1B:
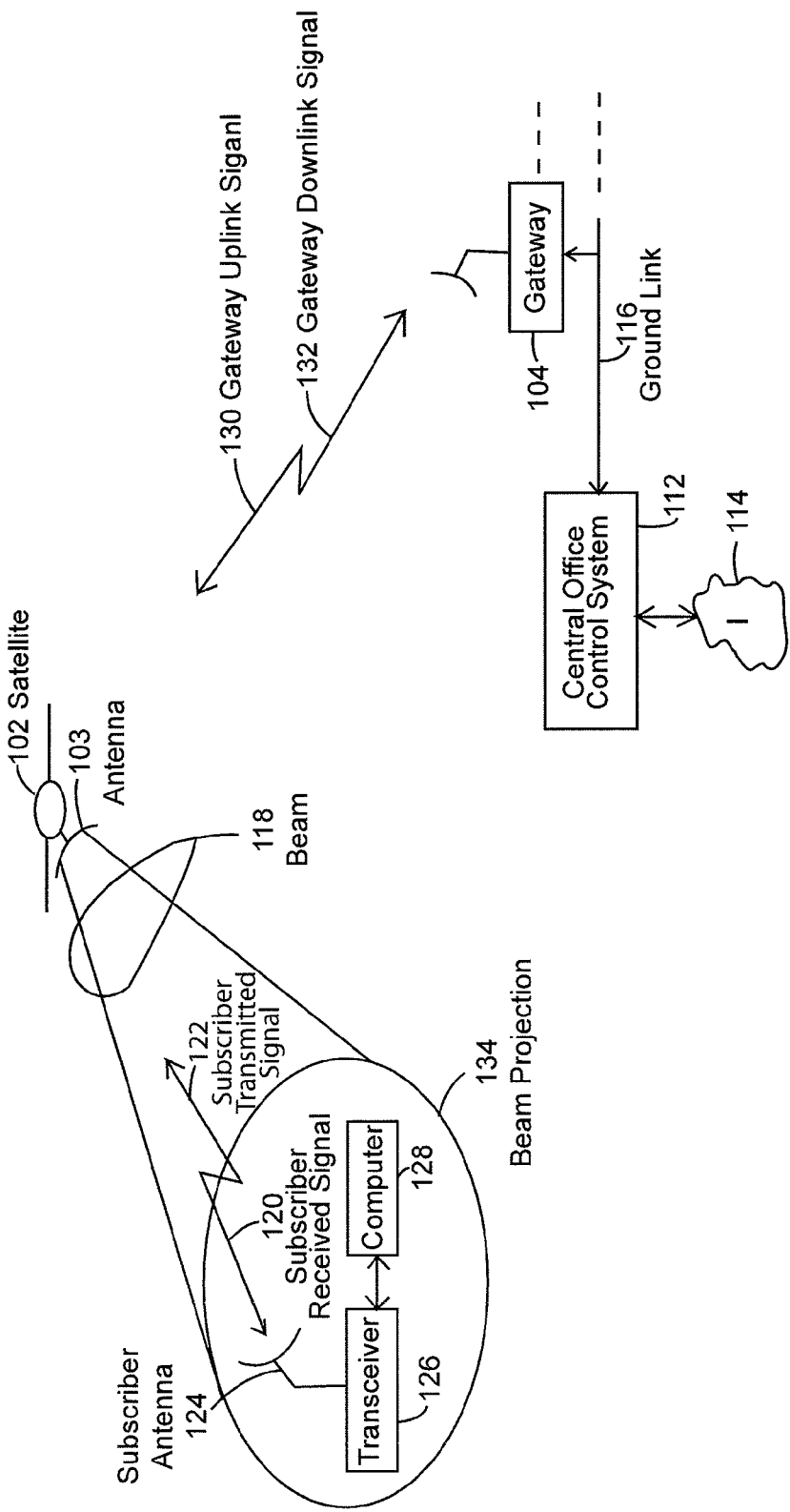
FIG. 1B is a schematic representation of the satellite communication system of FIG. 1A illustrating a single subscriber.

FIG. 1B illustrates a single beam 118, of the plurality of beams 108 (FIG. 1A), and a single subscriber located within the beam projection 134 of beam 118. The subscriber has a subscriber antenna 124 that is connected to a subscriber transceiver 126, which is connected to modem 127. Modem 127 is connected, in turn, to the subscriber computer 128. Transceiver 126 receives and transmits signals via subscriber antenna 124. Modem 127 processes data and controls the operation of transceiver 126. The subscriber computer 128 transmits and receives signals to and from modem 127. Transceiver 126 transmits the subscriber transmitted signal 122 (upstream signal) to the satellite 102 at 30 GHz. Similarly, transceiver 126 receives the subscriber received signal 120 (downstream signal) from the satellite 102 at 20 GHz. Beam 118 creates a beam projection 134 on the surface of the earth as a result of the focused antenna 103, which is one of a number of focused antennas mounted on the satellite 102 that create beam 108 and beam projections 110 (FIG. 1A), including beam projection 134. Antenna 103 is capable of transmitting the subscriber received signal 120 from the satellite 102 and receiving the subscriber transmitted signal 122.

As also shown in FIGS. 1A and 1B, signals are transmitted between the satellite 102 and the gateway 104, as explained above. Signals from the central office control system 112 are transmitted over ground link 116 to the gateway 104 and transmitted as a gateway uplink signal 130 to satellite 102. Similarly, subscriber transmitted signals 122 are received by the satellite 102 and transmitted to the gateway 104 as a gateway downlink signal 132. The satellite 102 also includes antennas that are directed specifically at the gateways. For example, a separate antenna is used to transmit the gateway downlink signal 132 to gateway 104 and receive the gateway uplink signal 130 from gateway 104. The gateway 104 includes a satellite modem termination system 133 that obtains data from the subscriber modem 127 every two seconds. The satellite modem termination system 133, disposed in the gateways, sends data at periodic intervals, i.e., 15-minute increments, to the central office control system 112 where the data is processed. This data includes the signal power of the subscriber received signal 120 at the subscriber modem 127, as well as the signal-to-noise ratio of the subscriber received signal 120. As indicated above, both the power level and the signal-to-noise ratio of the subscriber received signal 120 is encoded in the subscriber transmitted signal 122 and sent back to the satellite modem termination system 133. The satellite modem termination 133 system also keeps track of the status of each of the modems 127 at the subscriber locations. As also mentioned above, the central office control system 112 is linked to the Internet 114 to transmit and receive Internet data to and from the subscribers.

As described above, the gateway uplink signal 130, that is transmitted to the satellite 102, is transmitted to the subscriber as a subscriber received signal 120 via beam 118. When the modem 127 receives the subscriber received signal 120 via the subscriber antenna 124, the transceiver detects the signal strength and signal-to-noise ratio of the subscriber received signal 120. This data is encoded and attached to the subscriber transmitted signal 122 and sent by the satellite 102 via gateway downlink signal 132 which is received by the central office control system. This data indicates the signal strength and signal-to-noise ratio of the subscriber received signal 120. The signal strength and signal-to-noise ratio of the subscriber received signal 120 provides valuable information regarding the manner in which the antenna on the satellite 102 is pointed to create the beam 118, as explained in more detail below. Hence, the central office control system maintains a record of the signal strength of the subscriber received signal 120 that is periodically updated.

Figure 2:
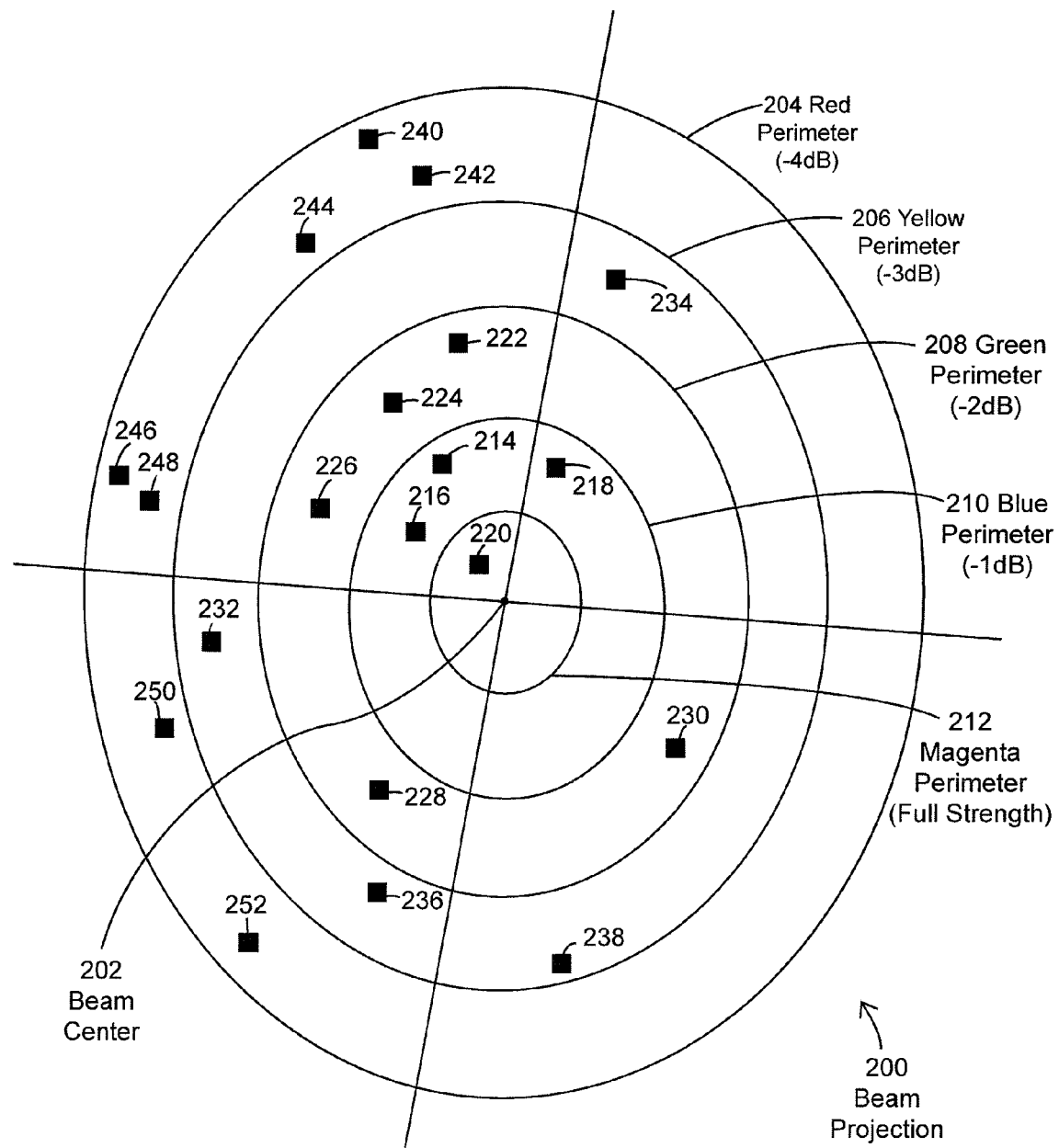
FIG. 2 is a schematic illustration of a satellite beam that is projected onto the earth's surface.

FIG. 2 is a schematic illustration of a beam projection 200 which may comprise one of the beam projections 110 illustrated in FIG. 1A. As shown in FIG. 2, the beam projection 200 has a beam center 202. The perimeters 204-212 are oval in shape because of the projection of the beam on the earth's surface and the location of the stationary satellite 102. The signal strength of the beam decreases in a manner that is related to the distance from the beam center 202. The roll off of signal strength is substantially parabolic. Subscribers at subscriber cell locations 214-252 provide encoded signal strength and signal-to-noise ratio signals, described above, to the central office control system 112. The beam projection 200 illustrates the various perimeters that result in a predetermined amount of attenuation or degradation in signal strength. For example, perimeter 204 indicates the attenuation of −4 dB in signal strength under normal conditions without interference from adjacent signals. Hence, subscribers within cells 240-252, on a clear day, and properly focused and properly aligned antenna without interference, would provide an encoded signal to the central office indicating that the signal strength was attenuated by approximately −4 dB from the signal strength at the beam center 202 between perimeter 204 and perimeter 206.

As mentioned above, the subscriber transmitted signal 122 also encodes the signal-to-noise ratio data of the subscriber received signal 120. In systems where interference occurs between adjacent beams, the signal-to-noise ratio signal is a more reliable metric for determining misalignment of a beam. The signal-to-noise ratio signal provides higher resolution than signal strength because of the interference problems with adjacent beams. In this manner, the signal-to-noise ratio is more accurate than the signal strength signal when interference is present. However, in systems that are not affected by interference, signal strength may be a better metric for determining proper placement of the beam. Hence, either the signal strength data or the signal-to-noise ratio data, that are encoded in the return, upstream signal from the subscriber can be used to determine proper alignment of the beam. This encoded data, i.e., the encoded signal strength and signal-to-noise ratio signals, that are encoded and transmitted upstream to the central office control system 112, are processed and color encoded at the central office control system 112 so that they can be displayed at the central office control system 112 to identify the actual location of the beam center or the edges of the beams. For example, signal strength data from cells 232-238, that are between the green perimeter 208 and yellow perimeter 206, can be expected to be color-coded as yellow since these cells indicate an attenuation of approximately −3 dB, under normal conditions. Cells 222-230, under normal conditions, will show attenuation between −1 dB and −2 dB. These cells can be expected to be displayed as a green response since they fall within the green perimeter 208. Cells 214, 216, 218, under normal conditions, show an attenuation of up to −1 dB, and as such can be expected to be color-coded as blue since they fall within the blue perimeter 210. Subscriber responses from cell 220 are sufficiently close to beam center 202 to show attenuation of less than −1 dB and can be expected to be color-coded as magenta since they fall within the magenta perimeter 212.

The signal-to-noise ratio signals can also be color encoded to display thematic mapping. For example, a similar encoding scheme may be used based upon different levels of the signal-to-noise ratio to provide a visual display of the signal-to-noise ratio signals from each of the cells 214-252. The cells 214-252 that are illustrated in FIG. 2 are representative cells in which one or more subscribers are located and provide a response for the geographical area of that cell. Of course, the cells illustrated in FIG. 2 are schematic representations of the cells in which subscribers provide data. In most locations throughout the USA, most of the cells in the grid of cells that encompass the beam projection 200 are populated with at least one subscriber so that many more cells than that shown in FIG. 2 provide data to the central office control system that color codes and displays the data. For example, the system operated by WildBlue Communications, Inc. has over 300,000 subscribers spread throughout the USA.

Since the cells 214-252 are color-coded and there are many of these cells that are populated by subscribers, an accurate depiction of the beam projection 200 can be easily discerned from the displayed color-coded thematic mapping data. This information can be used to ensure that the beam projection 200 is aligned with the proper beam center 202 and that the antenna 103 (FIG. 1B) is properly aligned.

Figure 3:
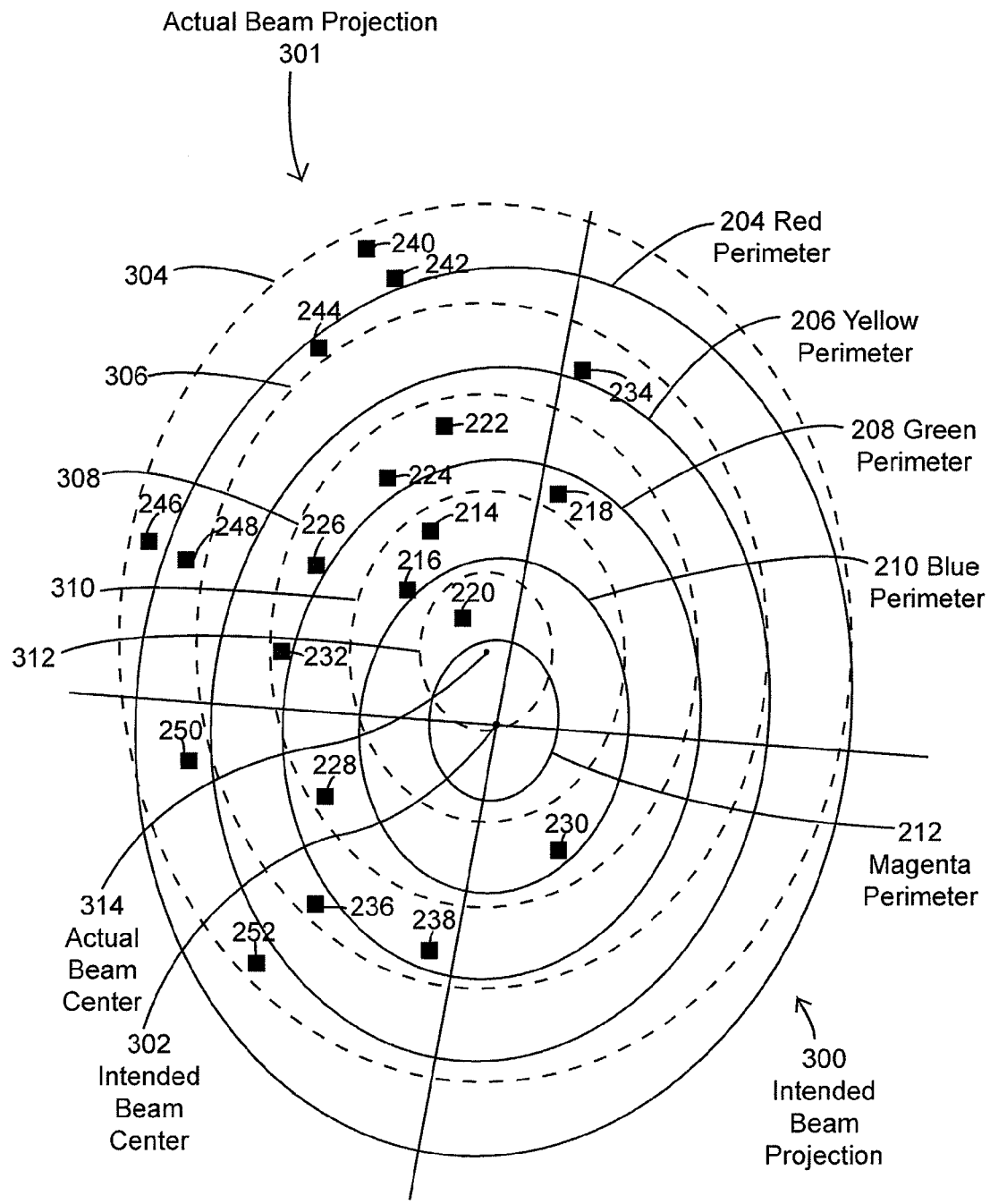
FIG. 3 is a schematic illustration of a satellite beam that is projected on the earth's surface at an incorrect location.

FIG. 3 illustrates a super-position of the intended beam projection 300 (solid lines) with actual beam projection 301 (dotted lines), as determined by the color-coded data from cells 214-252. As shown in FIG. 3, the intended beam projection perimeters 204-212 (solid lines), that are illustrated in FIG. 2, are overlaid with the actual beam projection perimeters 304-312 (dotted lines), as determined by the data provided by cells 214-252, which can be either signal strength data or signal-to-noise ratio data. As shown in FIG. 3, the intended beam center 202 is displaced from the actual beam center 314. The actual beam center 314 and each of the actual perimeters 304-312 are discernible from the color-coded responses from each of the cells 214-252. For example, a response from cell 234 would appear as yellow rather than red since element 234 is inside the yellow perimeter 306 for the actual beam projection. For the intended beam projection 300, element 234 would normally appear as red since it falls within the red perimeter 204. However, the actual data would show element 234 as yellow, indicating that the actual beam projection 301 differs from the intended beam projection 300. Similarly, responses from cells 222, 224, 226 would appear as green responses in the display of the actual data, whereas under the intended beam projection they would appear as yellow responses. In accordance with the intended beam projection perimeters 204-212, cells 214, 216, 218 should appear as green responses. However, cells 214, 216, 218 would appear in the displayed data as blue responses, since they fall within the blue perimeter 310. Again, most of the cells in the total grid of cells that fall within the geographical area of the beam projections, that are illustrated in FIG. 3, are populated with subscribers so that there is a large amount of data that clearly shows that the actual beam projection, shown by perimeter 304-312 (dotted perimeters), is not aligned with the actual beam projection, that is illustrated as the solid perimeter lines 204-212.

Hence, the color encoded data is capable of graphically illustrating the misalignment of the actual beam projection 301 with the intended beam projection 300. By analyzing this data, the position of the actual beam center 314 from the intended beam center 302 can be determined. Once the location of the actual beam center 314 to the intended beam center 302 is determined, the antenna array on the satellite, such as antenna 103 (FIG. 1B), can be moved to align the actual beam center 314 with the intended beam center 302. Control signals from the central office control system 112 are transmitted via the ground link 116 to the satellite control center (SCC). The satellite control center sends a control signal to the satellite 102 to adjust the alignment of the antennas in accordance with the distance and direction determined between the actual beam center 314 and the intended beam center 302. In this manner, the antennas on the satellite 102 can be properly aligned to create beam projections 110 (FIG. 1A) in the proper locations on the earth's surface. Of course, automated methods of determining the beam center can be utilized, such as pattern recognition techniques, including edge detection techniques. These processes are well known to those skilled in the art. This process can be performed by analyzing the displayed data or simply by analyzing the raw data without displaying that data. Again, this data can comprise either the signal strength data or the signal-to-noise ratio data, or a combination of both. Further, pattern recognition techniques do not actually have to determine the beam center, but rather, can determine the offset using other portions of the intended beam projection 300 and the actual beam projection 301. Further, both the antenna systems and the satellite itself can be aligned by iteratively moving the antennas and/or satellite and viewing the graphical representations of the displayed data until the antenna and/or satellite is properly aligned. In this manner, computational techniques for determining displacement of the antennas and/or satellite, as well as correction signals to correct alignment of the antennas and/or satellite, are not required.

As indicated above, both the signal strength data and the signal-to-noise ratio data can be used for aligning the antennas on the satellite to ensure that the beam projections 110, that are illustrated in FIG. 1A, are properly aligned on the ground. In addition, this data can also be used to properly align the satellite with respect to the earth's surface. In existing systems, a beacon site is used in the Arctic that receives beacon signals from the satellite and provides steering and alignment signals to the satellite so that the satellite beacon remains pointed at the beacon site. The beacon site is expensive to build and operate. Both the signal strength signals and the signal-to-noise ratio signals can be used to properly maintain the orientation of the satellite so that the satellite antennas are properly aligned on the ground. Hence, both the signal strength data and the signal-to-noise ratio data can be used for both aligning antennas and for aligning the satellite.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of pointing and tracking an antenna on a satellite with respect to an intended beam projection of said satellite antenna, the method comprising:
    defining a plurality of intended signal-to-noise ratio perimeters based on an expected attenuation of the intended beam projection at the signal-to-noise ratio perimeters;
    categorizing expected attenuation for a plurality of subscribers at known subscriber locations according to the intended signal-to-noise ratio perimeters;
    receiving, from the plurality of subscribers, signal-to-noise ratio data relating to the signal-to-noise ratio of signals transmitted from said satellite antenna and received at said plurality of known subscriber locations;
    analyzing said signal-to-noise ratio data to determine actual attenuation categories for said plurality of subscribers; and
    aligning said satellite antenna based at least in part upon a difference between said expected attenuation categories for said plurality of subscribers and said actual attenuation categories for said plurality of subscribers.

2. The method of claim 1, wherein said process of analyzing said signal-to-noise ratio data comprises:
    graphically displaying said signal-to-noise ratio data to produce a graphical representation of said actual attenuation categories for said plurality of subscribers; and
    determining an actual beam center of said actual beam projection from said graphical representation.

3. The method of claim 2 wherein said process of analyzing said data further comprises:
    color encoding said signal-to-noise ratio data relating to said signal-to-noise ratio.

4. The method of claim 1 further comprising:
    graphically displaying said signal-to-noise ratio data to produce a graphical representation of said actual attenuation categories for said plurality of subscribers; and
    iteratively moving said antennas and viewing said graphical representation until said antennas are properly aligned.

5. The method of claim 1 wherein said step of analyzing said data comprises:
    computationally determining an actual beam projection of said satellite antennas from said signal-to-noise ratio data without graphically displaying said signal-to-noise ratio data.

6. The method of claim 5 wherein said step of computationally determining said actual beam projection further comprises:
    computationally determining an actual beam center from said signal-to-noise ratio data.

7. A method of pointing and tracking an antenna on a satellite with respect to an intended beam projection of said satellite antenna, the method comprising:
    defining a plurality of intended signal strength perimeters based on an expected attenuation of the intended beam projection at the signal strength perimeters;
    categorizing expected attenuation for a plurality of subscribers at known subscriber locations according to the intended signal strength perimeters;
    receiving, from the plurality of subscribers, signal strength data relating to the signal strength of signals transmitted from said satellite antenna and received at said plurality of known subscriber locations;
    analyzing said signal strength data to determine actual attenuation categories for said plurality of subscribers;
    aligning said satellite antenna based at least in part upon a difference between said expected attenuation categories for said plurality of subscribers and said actual attenuation categories for said plurality of subscribers.

8. The method of claim 7 wherein said process of analyzing said signal strength data comprises:
    graphically displaying said signal strength data to produce a graphical representation of said actual attenuation categories for said plurality of subscribers;

determining an actual beam center of an actual beam projection from said graphical representation.

9. The method of claim 8 wherein said process of analyzing said signal strength data further comprises:
color encoding said signal strength data.

10. The method of claim 7 further comprising:
graphically displaying said signal strength data to produce a graphical representation of said actual attenuation categories for said plurality of subscribers; and
iteratively moving said antenna and viewing said graphical representation until said antenna is properly aligned.

11. The method of claim 7 wherein said step of analyzing said signal strength data comprises:
computationally determining an actual beam projection of said antenna from said signal strength data without graphically displaying said signal strength data.

12. The method of claim 11 wherein said step of computationally determining said actual beam projection further comprises:
computationally determining an actual beam center from said signal strength data.

13. The method of claim 12 wherein said process of aligning said satellite antenna further comprises:
determining a differential distance and angle of said actual beam center from an intended beam center;
generating antenna adjustment data based upon said differential distance and angle; and
transmitting said antenna adjustment data to said satellite to adjust said antenna.

14. A method of aligning a satellite with respect to the earth's surface, the method comprising:
defining a plurality of intended signal-to-noise ratio perimeters for each beam transmitted from antennas of said satellite based on expected attenuation of said each beam;
categorizing expected attenuation for a plurality of subscribers at known subscriber locations according to the intended signal-to-noise ratio perimeters;
receiving, from the plurality of subscribers, signal-to-noise ratio data relating to the signal-to-noise ratio of signals transmitted from antennas of said satellite and received at said plurality of known subscriber locations;
analyzing said signal-to-noise ratio data to determine actual attenuation categories for said plurality of subscribers;
comparing said actual actual attenuation categories for said plurality of subscribers with said expected attenuation categories for said plurality of subscribers to create a satellite alignment signal; and
aligning said satellite with respect to said earth's surface using said satellite alignment signal.

15. The method of claim 14 wherein said process of analyzing said signal-to-noise ratio data comprises:
graphically displaying said signal-to-noise ratio data to produce graphical representations of said actual attenuation categories for said plurality of subscribers; and
determining actual beam centers of actual beam projections from said graphical representations.

16. The method of claim 15 wherein said process of analyzing said signal-to-noise ratio data further comprises:
color encoding said signal-to-noise ratio data.

17. The method of claim 14 further comprising:
graphically displaying said signal-to-noise ratio data to produce graphical representations of said actual attenuation categories for said plurality of subscribers;
iteratively moving said satellite and viewing said graphical representations of said actual attenuation categories for said plurality of subscribers until said satellite is properly aligned.

18. The method of claim 14 wherein said step of analyzing said data comprises:
computationally determining actual beam projections of said antennas from said signal-to-noise ratio data without graphically displaying said signal-to-noise ratio data.

19. The method of claim 18 wherein said step of computationally determining said actual locations of said beam projections further comprises:
computationally determining actual beam centers of said actual beam projections from said signal-to-noise ratio data.

20. A method of aligning a satellite with respect to the earth's surface, the method comprising:
defining a plurality of intended signal strength perimeters for each beam transmitted for antennas of said satellite based on expected attenuation of said each beam;
categorizing expected attenuation for a plurality of subscribers at known subscriber locations according to the intended signal strength perimeters;
receiving, from the plurality of subscribers, signal strength data relating to the signal strength of signals transmitted from antennas of said satellite and received at said plurality of known subscriber locations;
analyzing said signal strength data to determine actual attenuation categories for said plurality of subscribers;
comparing said actual attenuation categories for said plurality of subscribers with said expected attenuation categories for said plurality of subscribers to create a satellite alignment signal; and
aligning said satellite with respect to said earth's surface using said satellite alignment signal.

21. The method of claim 20 wherein said process of analyzing said signal strength data comprises:
graphically displaying said signal strength data to produce graphical representations of said actual attenuation categories for said plurality of subscribers; and
determining actual beam centers of actual beam projections from said graphical representations.

22. The method of claim 21 wherein said process of analyzing said signal strength data further comprises:
color encoding said signal strength data.

23. The method of claim 20 further comprising:
graphically displaying said signal strength data to produce graphical representations of said actual attenuation categories for said plurality of subscribers; and
iteratively moving said satellite and viewing said graphical representations of said actual attenuation categories for said plurality of subscribers until said satellite is properly aligned.

24. The method of claim 20 wherein said step of analyzing said signal strength data comprises:
computationally determining actual beam projections of said antennas from said signal strength data.

25. The method of claim 24 wherein said step of computationally determining said actual beam projections further comprises:
computationally determining actual beam centers of said actual beam projections from said signal strength data.

26. The method of claim 25 wherein said process of aligning said stationary satellite further comprises:
determining differential distances and angles of said actual beam centers with respect to intended beam centers;

generating satellite adjustment data based upon said differential distances and angles; and transmitting said satellite adjustment data to said satellite to adjust said satellite.

27. A system for aligning an antenna on a satellite with respect to an intended beam projection comprising:

a plurality of subscriber transceivers at known subscriber locations that receive downstream signals transmitted from said satellite antenna and transmit upstream signals;

a plurality of subscriber modems coupled to said plurality of subscriber transceivers that determine signal-to-noise ratio data of said downstream signals and encode said upstream signals with said signal-to-noise ratio data;

a control system that defines a plurality of intended signal-to-noise ratio perimeters based on an expected attenuation of the intended beam projection at the signal-to-noise ratio perimeters, categorizes expected attenuation for the plurality of subscriber transceivers according to the intended signal-to-noise ratio perimeters, receives said plurality of upstream signals, extracts said signal-to-noise ratio data from said upstream signals, analyzes said signal-to-noise ratio data to determine actual attenuation categories for said plurality of subscriber transceivers, compares said actual attenuation categories for said plurality of subscriber transceivers with said expected attenuation categories for said plurality of subscriber transceivers to produce an antenna alignment signal, and encodes a control with said antenna alignment signal to align said antenna.

28. The system of claim 27 further comprising:
a display that graphically displays said actual attenuation categories for said plurality of subscribers transceivers.

29. The system of claim 28 wherein said graphical display further comprises:
a display that graphically displays color encoded signal-to-noise ratio data.

30. A system for aligning an antenna on a satellite with respect to an intended beam projection comprising:

a plurality of subscriber transceivers at known subscriber locations that receive said downstream signals transmitted from said satellite antenna and transmit upstream signals;

a plurality of subscriber modems coupled to said plurality of subscriber transceivers that determine signal strength data of said downstream signals and encode said upstream signals with said signal strength data;

a control system that defines a plurality of intended signal strength perimeters based on an expected attenuation of the intended beam projection at the signal strength perimeters, categorizes expected attenuation for the plurality of subscriber transceivers according to the intended signal strength perimeters, receives said plurality of upstream signals, extracts said signal strength data from said upstream signals, analyzes said signal strength data to determine actual attenuation categories for said plurality of subscriber transceivers, compares said actual attenuation categories for said plurality of subscriber transceivers with said expected attenuation categories for said plurality of subscriber transceivers to produce an antenna alignment signal, and encodes a control signal with said antenna alignment signal to align said antenna.

31. The system of claim 30 further comprising:
a display that graphically displays said actual attenuation categories for said plurality of subscriber transceivers.

32. The system of claim 31 wherein said graphical display further comprises:
a display that graphically displays color encoded signal strength data.

33. A system for aligning a satellite with respect to the earth's surface comprising:

a plurality of subscriber transceivers at known subscriber locations that receive downstream signals from said satellite and transmit upstream signals;

a plurality of subscriber modems coupled with said plurality of subscriber transceivers that determine signal-to-noise ratio data of said downstream signals and encode said upstream signals with said signal-to-noise ratio data;

a control system that defines a plurality of intended signal-to-noise ratio perimeters for each beam transmitted from antennas of said satellite based on expected attenuation of said each beam, categorizes expected attenuation for the plurality of subscriber transceivers according to the intended signal-to-noise ratio perimeters, receives said plurality of upstream signals, extracts said signal-to-noise ratio data from said upstream signals, analyzes said signal-to-noise ratio data to determine actual attenuation categories for said plurality of subscriber transceivers, compares said actual attenuation categories for said plurality of subscriber transceivers with said expected attenuation categories for said plurality of subscriber transceivers to produce a satellite alignment signal, and encodes a control signal with said satellite alignment signal to align said satellite.

34. The system of claim 33 further comprising:
a display that graphically displays said actual attenuation categories for said plurality of subscriber transceivers.

35. The system of claim 34 wherein said graphical display further comprises:
a display that graphically displays color encoded signal-to-noise ratio data.

36. A system for aligning a satellite with respect to the earth's surface comprising:

a plurality of subscriber transceivers at known subscriber locations that receive downstream signals from said satellite and transmit upstream signals;

a plurality of subscriber modems coupled with said plurality of subscriber transceivers that determine signal strength data of said downstream signals and encode said upstream signals with said signal strength data;

a control system that defines a plurality of intended signal strength perimeters for each beam transmitted from antennas of said satellite based on expected attenuation of said each beam, categorizes expected attenuation for the plurality of subscriber transceivers according to the intended signal strength perimeters, receives said plurality of upstream signals, extracts said signal strength data from said upstream signals, analyzes said signal strength data to determine actual attenuation categories for said plurality of subscriber transceivers, compares said actual attenuation categories for said plurality of subscriber transceivers with said expected attenuation categories for said plurality of subscriber transceivers to produce a satellite alignment signal, and encodes a control signal with said satellite alignment signal to align said satellite.

37. The system of claim 36 further comprising:
a display that graphically displays said actual attenuation categories for said plurality of subscriber transceivers.

38. The system of claim 37 wherein said graphical display farther comprises:

a display that graphically displays color encoded signal strength data.

* * * * *

UNITED STATES PATENT AND TRADEMARK OFFICE
CERTIFICATE OF CORRECTION

| | |
|---|---|
| PATENT NO. | : 8,538,328 B2 |
| APPLICATION NO. | : 12/544130 |
| DATED | : September 17, 2013 |
| INVENTOR(S) | : Mills et al. |

It is certified that error appears in the above-identified patent and that said Letters Patent is hereby corrected as shown below:

In the Claims

In claim 20, column 10, line 20, delete "for antennas", and insert --from antennas--;
In claim 28, column 11, line 34, delete "subscribers", and insert --subscriber--; and
In claim 30, column 11, line 42, delete "receive said downstream", and insert --receive downstream--.

Signed and Sealed this
First Day of April, 2014

Michelle K. Lee
*Deputy Director of the United States Patent and Trademark Office*